United States Patent
Chai et al.

(10) Patent No.: US 9,215,148 B2
(45) Date of Patent: Dec. 15, 2015

(54) METHOD AND DEVICE FOR TERMINAL DEVICE MANAGEMENT BASED ON RIGHT CONTROL

(75) Inventors: Xiaoqian Chai, Shenzhen (CN); Linyi Tian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 13/086,772

(22) Filed: Apr. 14, 2011

(65) Prior Publication Data

US 2011/0196966 A1 Aug. 11, 2011

Related U.S. Application Data

(63) Continuation of application No. PCT/CN2009/074432, filed on Oct. 14, 2009.

(30) Foreign Application Priority Data

Oct. 14, 2008 (CN) .......................... 2008 1 0224254

(51) Int. Cl.
*H04L 12/24* (2006.01)
*H04L 29/06* (2006.01)
(Continued)

(52) U.S. Cl.
CPC ............. *H04L 41/28* (2013.01); *G06F 21/604* (2013.01); *G06F 21/6218* (2013.01); *G06F 21/6227* (2013.01); *H04L 63/101* (2013.01)

(58) Field of Classification Search
CPC ..... H04L 67/125; H04L 63/101; H04L 41/28; G06F 21/604; G06F 21/6218; G06F 21/6227
See application file for complete search history.

(56) References Cited

U.S. PATENT DOCUMENTS 7,747,722 B2 * 6/2010 Kim .............................. 709/223
8,131,739 B2 * 3/2012 Wu et al. ....................... 707/758
(Continued)

FOREIGN PATENT DOCUMENTS

CN 101001148 A 7/2007
CN 101123785 A 2/2008
(Continued)

OTHER PUBLICATIONS oma, Open Mobile Alliance, OMA Device Management Tree and Description, Jun. 17, 2008, p. 1-48.*
(Continued)

*Primary Examiner* — Gregory Todd
(74) *Attorney, Agent, or Firm* — Brinks Gilson & Lione

(57) ABSTRACT

A method and a device for terminal device management based on right control are provided. The method includes the following steps. A Get command on an access control list (ACL) of a managed node in a device management tree (DMT) from a device management (DM) server is received, where the Get command includes a Unified Resource Identity (URI) of the managed node. It is determined whether the DM server has a direct right of executing the Get command on the managed node. The Get command is processed when it is determined that the DM server has the direct right of executing the Get command on the managed node. The method and the device simplify the complexity of right management, and reduce the number of times of message interaction between the DM server and a terminal device, thereby improving the efficiency and performance of terminal device management.

4 Claims, 8 Drawing Sheets

(51) Int. Cl.
*G06F 21/60* (2013.01)
*G06F 21/62* (2013.01)

(56) References Cited

U.S. PATENT DOCUMENTS

| | | | |
|---|---|---|---|
| 8,140,650 B2* | 3/2012 | Pulkkinen et al. | 709/220 |
| 2003/0188198 A1* | 10/2003 | Holdsworth et al. | 713/201 |
| 2005/0289229 A1 | 12/2005 | Kim | |
| 2006/0294051 A1* | 12/2006 | Kapadia et al. | 707/1 |
| 2007/0162980 A1* | 7/2007 | Moloney et al. | 726/27 |
| 2007/0250933 A1* | 10/2007 | Rantanen | 726/26 |
| 2008/0189404 A1 | 8/2008 | He et al. | |
| 2010/0138537 A1 | 6/2010 | Ye et al. | |
| 2011/0231538 A1 | 9/2011 | He et al. | |
| 2012/0094636 A1 | 4/2012 | Li et al. | |

FOREIGN PATENT DOCUMENTS

| | | |
|---|---|---|
| CN | 101330500 A | 12/2008 |
| CN | 101360121 A | 2/2009 |
| CN | 101677441 A | 3/2010 |
| JP | 2007193826 | 8/2007 |
| JP | 2008502075 | 1/2008 |
| JP | 2010500792 | 1/2010 |
| JP | 2010506518 | 2/2010 |
| KR | 100620054 B1 | 9/2006 |
| KR | 1020080057277 A | 6/2008 |
| WO | WO 2008046327 A1 | 4/2008 |
| WO | WO 2010/043175 A1 | 4/2010 |

OTHER PUBLICATIONS

Office Action issued in corresponding Chinese Patent Application No. 200810224254.6, mailed May 3, 2012.
Office Action issued in corresponding Japanese Patent Application No. 2011531337, mailed Sep. 4, 2012.
Office Action issued in corresponding Korean Patent Application No. 10-20117009819, mailed Sep. 11, 2012.
Written Opinion of the International Searching Authority issued in corresponding PCT Patent Application No. PCT/CN2009/074432, mailed Jan. 21, 2010.
Extended European Search Report issued in corresponding European Patent Application No. 09820251.8, mailed Jan. 27, 2012.
Oma, "OMA Device Management Tree and Description" Approved Version 1.2.1, OMA-TS-DM_TND-V1_2_1-20080617-A, Jun. 17, 2008.
Oma, "ACL Enhance Get Right" Change Request. OMA-TS-DM_TND-V1_3-20090129-D, Aug. 17, 2009. XP-002666927.
Oma, "ACL Enhance Replace Right" Change Request. OMA-TS-DM_TND-V1_3-20090129-D, Aug. 17, 2009. XP-002666928.
Oma, "DM Possible Future Functionality" Input Contribution. OMA-DM-2007-0054R04-INP_DM_Possible_future_functionality, Nov. 25, 2007.
Oma, "Harmonization of DM 1.x and 2.x Work" Input Contribution. OMA-DM-2008-0072R03-INP_DM_1x_2x_discussion, Apr. 28, 2008.
Office Action issued in corresponding Japanese Patent Application No. 2011-531337, mailed Feb. 26, 2013.
Office Action issued in corresponding Korean Patent Application No. 10-2012-029307, mailed Jan. 22, 2013.
Office Action issued in corresponding Korean Patent Application No. 10-2012-7029306, mailed Jan. 22, 2013.
Extended European Search Report issued in corresponding European Patent Application No. 12184386.6, mailed Dec. 5, 2012.
Extended European Search Report issued in corresponding European Patent Application No. 12184392.4, mailed Dec. 4, 2012.
OMA, "OMA Device Management Tree and Description" Approved Version 1.2.1, Jun. 17, 2008.
Chang et al., "ACL Enhance Get Right" Change Request, OMA, Aug. 17, 2009. XP-002666928.
Chang et al., "ACL Enhance Get Right" Change Request, OMA, Aug. 17, 2009. XP-002666927.

* cited by examiner

METHOD AND DEVICE FOR TERMINAL DEVICE MANAGEMENT BASED ON RIGHT CONTROL

CROSS-REFERENCE TO RELATED APPLICATIONS

This application is a continuation of International Application No. PCT/CN2009/074432, filed on Oct. 14, 2009, which claims priority to Chinese Patent Application No. 200810224254.6, filed on Oct. 14, 2008, both of which are hereby incorporated by reference in their entireties.

FIELD OF THE INVENTION

The present invention relates to the field of device management (DM), and more particularly, to a method and a device for terminal device management based on right control.

BACKGROUND OF THE INVENTION

Currently, with the increase of the complexity of the terminal device and growth of services, demands of managing and configuring a terminal device in a manner of Over The Air (OTA) are increasingly urgent. To manage a terminal device in the manner of OTA with security, the Open Mobile Alliance (OMA) developed a DM protocol. The terminal device supporting the OMA DM service function generally has a DM client, responsible for performing operations such as OMA DM protocol parsing, session management, and session security. Meanwhile, the terminal device supporting the OMA DM service function generally further includes a device management tree (DMT). The DMT organizes all available management objects in the terminal device together, and each node in the DMT has a unique Unified Resource Identity (URI) for being located.

FIG. 1 is a schematic structural diagram of a DMT. As shown in FIG. 1, the summit is a root node of the DMT, the root node includes child nodes (internal nodes or leaf nodes), and each internal node may further include child nodes. The node of a higher level that the child nodes are subordinate to is referred to as a parent node. On the basis of the DMT as shown in FIG. 1, a DM server sends related management commands such as Get, Add, Replace, Delete, and Exec to the nodes of the DMT through the OMA DM protocol, and the terminal device is managed through operations on the DMT (except a part of interactive commands).

In a solution of the prior art, each node on the DMT includes a property value of an access control list (ACL). The ACL is used to control an operation right of the DM server for each node, and specifies the DM commands that a certain DM server can execute on a target node. The ACL may be inherited, and a specific inheritance method is as follows: When a property value of an ACL of a certain node is empty, an ACL of its parent node is searched. If the ACL of the parent node is also empty, a grandparent node of the target node is searched, and so forth, until an ACL which is not empty is found, and the ACL which is not empty is inherited.

When the DM server needs to visit or operate a property or value of a certain node, if an ACL of the target node is not endowed with a right corresponding to the server, a value of the ACL of the target node must be firstly replaced to endow the DM server with a corresponding operation right; and then the DM server is enabled to perform a corresponding visit or operation. In the prior art, to replace an ACL of a target node, the DM server must have a Replace right of the node or its parent node. If the DM server has the Replace right of the target node or its parent node, the ACL is directly replaced. If the DM server does not have the Replace right of the target node or its parent node, it is searched whether the DM server has a Replace right of a grandparent node of the target node. If the DM server has a Replace right of a grandparent node of the target node, the value of the ACL of the parent node is firstly replaced so that the DM server acquires the Replace right, then the ACL of the target node is replaced, and the process that the ACL of the target node is replaced is carried out level-by-level accordingly.

In the implementation of the present invention, the inventor found at least the following defects in the solution of the prior art. If the DMT has multi-level rights, to get a node management right, the DM server gets an ACL of an entire subtree, and the ACL of the entire subtree includes a great deal of useless information; or the DM server sends a plurality of Get commands, one Get command only gets an ACL of one node, an ACL of a corresponding node is replaced level-by-level, and the plurality of Get commands causes complex interactions and a large number of messages. In this manner, the number of times of message interaction between the DM server and the terminal device are increased, pressure is caused on processing capabilities of the DM server and the terminal device as well as on network transmission, and the efficiency and performance of terminal device management are reduced.

SUMMARY OF THE INVENTION

Embodiments of the present invention provide a method and a device for terminal device management based on right control, so as to simplify right management, reduce the number of times of message interaction between a DM server and a terminal device, reduce the pressure on the DM server and the terminal device as well as the pressure on network transmission, and improve the efficiency and performance of terminal device management.

An embodiment of the present invention provides a method for getting an access control list (ACL) based on right control, where the method includes the following steps.

A Get command, sent from a DM server, for an ACL of a managed node in a DMT is received.

It is determined whether the DM server has a direct right of executing the Get command on the managed node.

The Get command is processed when it is determined that the DM server has the direct right of executing the Get command on the managed node.

An embodiment of the present invention provides a method for replacing an ACL based on right control, where the method includes the following steps.

A Replace command, sent from a DM server, for the ACL of a managed node in a DMT is received.

It is determined whether the DM server has a direct or indirect Replace right of executing the Replace command on the managed node.

The Replace command is processed when it is determined that the DM server has the direct or indirect Replace right.

An embodiment of the present invention provides a device for terminal device management based on right control, where the device includes a management command receiving unit, a direct right judging unit, an indirect right judging unit, and a management command processing unit.

The management command receiving unit is configured to receive, from a DM server, a management command on a managed node in a DMT.

The direct right judging unit is configured to judge whether the DM server has a direct right of executing the management command on the managed node.

The indirect right judging unit is configured to judge whether the DM server has an indirect right of executing the management command on the managed node.

The management command processing unit is configured to process the management command, when the direct right judging unit determines that the DM server has the direct right or the indirect right judging unit determines that the DM server has the indirect right.

An embodiment of the present invention provides a system for terminal device management based on right control, where the system includes a DM server and a terminal device.

The DM server is configured to send a management command to the terminal device.

The terminal device is configured to receive, from a DM server, the management command on a managed node in a DMT; judge whether the DM server has a direct or indirect right of executing the management command on the managed node; and if the DM server has a direct right or indirect right of executing the management command on the managed node, process the management command.

DETAILED DESCRIPTION OF THE EMBODIMENTS

Figure 1:
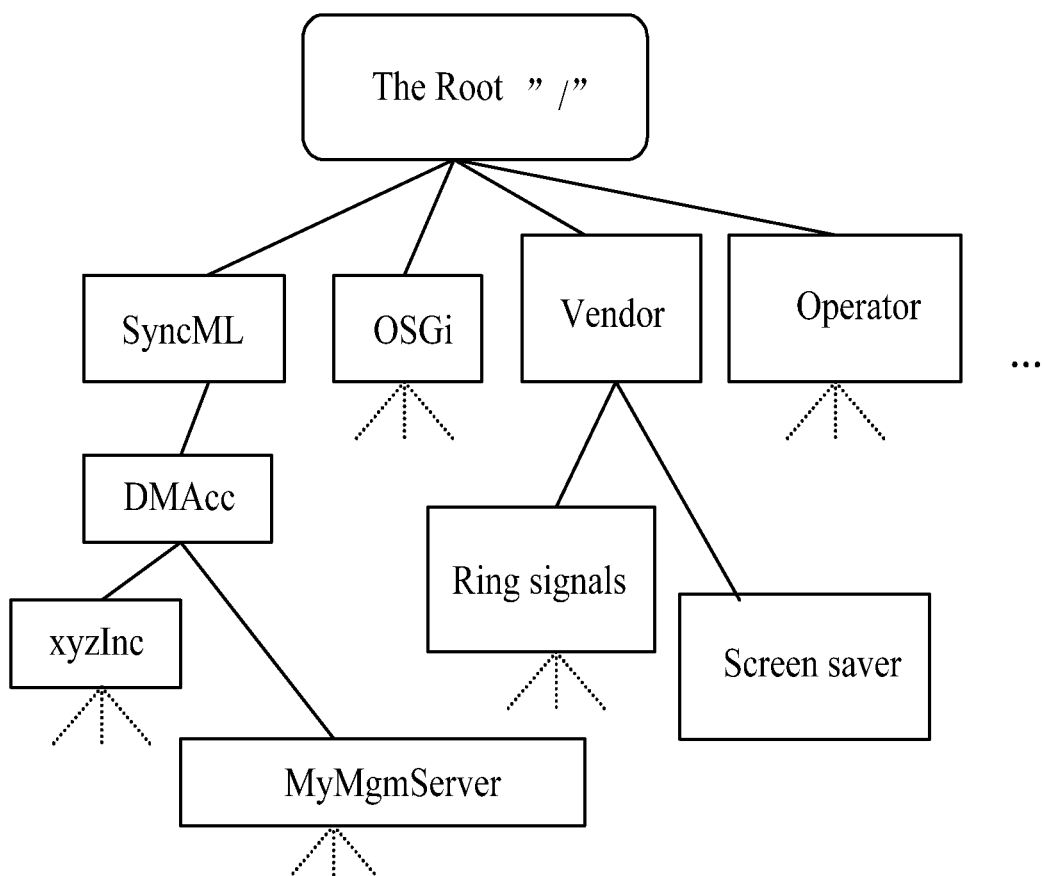
FIG. 1 is a schematic structural diagram of a DMT in the prior art.
Figure 2:
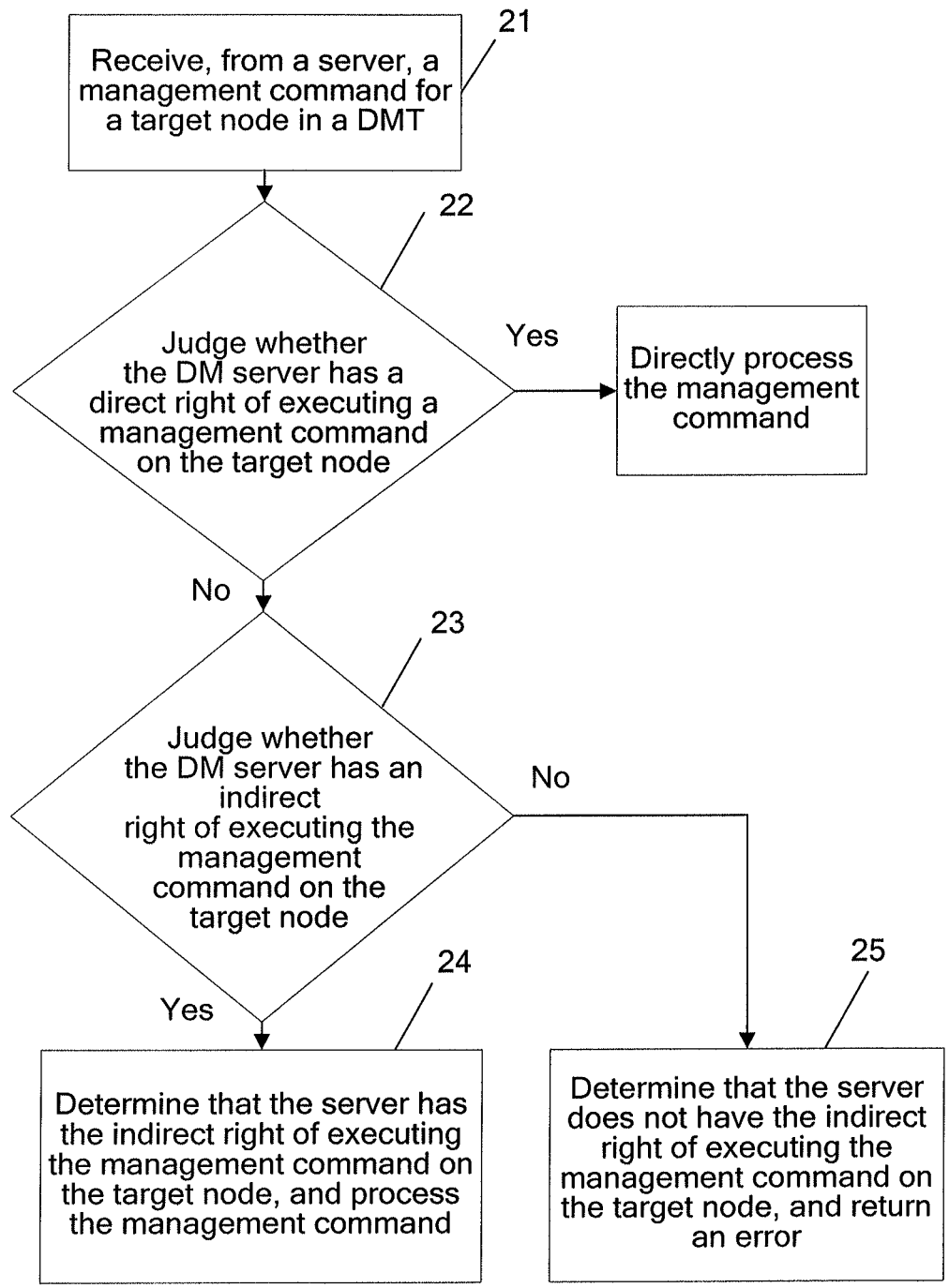
FIG. 2 is a schematic flow chart of a method for terminal device management based on right control according to a first embodiment of the present invention.

Specific embodiments of the present invention are illustrated below with reference to the accompanying drawings. In the following descriptions, all nodes between a certain node to a root node in a terminal DMT may be referred to as ancestor nodes (including the root node) of the node. FIG. 2 is a schematic flow chart of a method for terminal device management based on right control according to a first embodiment of the present invention. As shown in FIG. 2, the method includes the following steps.

In step 21, a management command, from a DM server, for a target node in a DMT is received.

Specifically, when the DM server needs to execute a certain DM command on a target node in the DMT of a terminal device, the DM server sends the management command carrying a URI of the target node to the terminal device, and a particular functional module in the terminal device receives the management commands. The management commands may include Add, Delete, Replace, Get, and Exec.

In step 22, it is judged whether the DM server has a direct right of executing a management command on the target node.

Specifically, the terminal device may judge according to a value of an ACL of the target node whether the DM server has a direct right of executing the management command on the target node. The direct right mentioned here refers to the value of the ACL of the target node is utilized to directly judge whether the DM server has a corresponding right of executing the management command on the target node. For example, the terminal device may firstly get the value of the ACL of the target node; then it is judged whether the gotten value of the ACL includes a corresponding item of the management command, and whether the corresponding item includes an identifier of the DM server; and if the gotten value of the ACL includes a corresponding item of the management command, and the corresponding item includes the identifier of the DM server, it is determined that the DM server has the direct right of executing the management command on the target node, and then the management command can be directly processed; if the gotten value of the ACL does not include a corresponding item of the management command, or the corresponding item does not include the identifier of the DM server, the judgment in step 23 is performed subsequently.

The getting the value of the ACL of the target node is specifically as follows: If a property value of the ACL of the target node itself is not empty, the property value of the ACL of the target node is gotten. If the property value of the ACL of the target node itself is empty, the looking-for process begins from the target node to its ancestor nodes, and a property value of an ACL of an ancestor node closest to the target node and the property value of the ACL of which is not empty is gotten as the value of the ACL of the target node. In other words, the gotten value of the ACL of the target node can be inherited from a value of an ACL of an ancestor node.

In step 23, it is judged whether the DM server has an indirect right of executing the management command on the target node.

Specifically, a right speculation manner is utilized to judge whether the DM server has an indirect right of executing the management command on the target node. The indirect right mentioned here refers to a speculation manner is utilized to indirectly judge whether the DM server has a corresponding right of executing the management command on the target node. The specific speculation manners vary with different nodes on which speculation is performed. For example, it is judged whether the DM server has a Replace right for a certain node between the target node and a root node of the DMT; and if the DM server has the Replace right for a certain node between the target node and a root node of the DMT, it is determined that the DM server has the indirect right of executing the management command on the target node.

The judging method may be as follows: It is judged level-by-level from the target node to the root node of the DMT whether a node, a Replace item in a value of an ACL of which includes an identifier of the DM server, exists. If the node, the Replace item in the value of the ACL of which includes the identifier of the DM server exists, it is determined that the DM server has the Replace right for the node between the target node and the root node of the DMT. The node refers to a node, the Replace item in the value of the ACL of which includes the identifier of the DM server. Then, step 24 is performed subsequently; if the node, the Replace item in the value of the ACL of which includes the identifier of the DM server, does not exist, step 25 is performed.

In step 24, it is determined that the DM server has the indirect right of executing the management command on the target node, and the management command is processed.

The processing the management command is that the terminal device executes a corresponding operation such as Add, Delete, Replace, Get, and Exec according to the management command send by the DM server.

In step 25, it is determined that the DM server does not have the indirect right of executing the management command on the target node, and an error is returned.

By implementing the technical solution, the capability of right speculation of the terminal device is enhanced. In other words, the terminal device is enabled to judge according to the indirect right whether a corresponding process can be performed, and the DM server does not need to replace a right level-by-level, so as to simplify the complexity of right management, and reduce the number of times of message interaction between the DM server and the terminal device, thereby improving the efficiency and performance of terminal device management.

Figure 3:
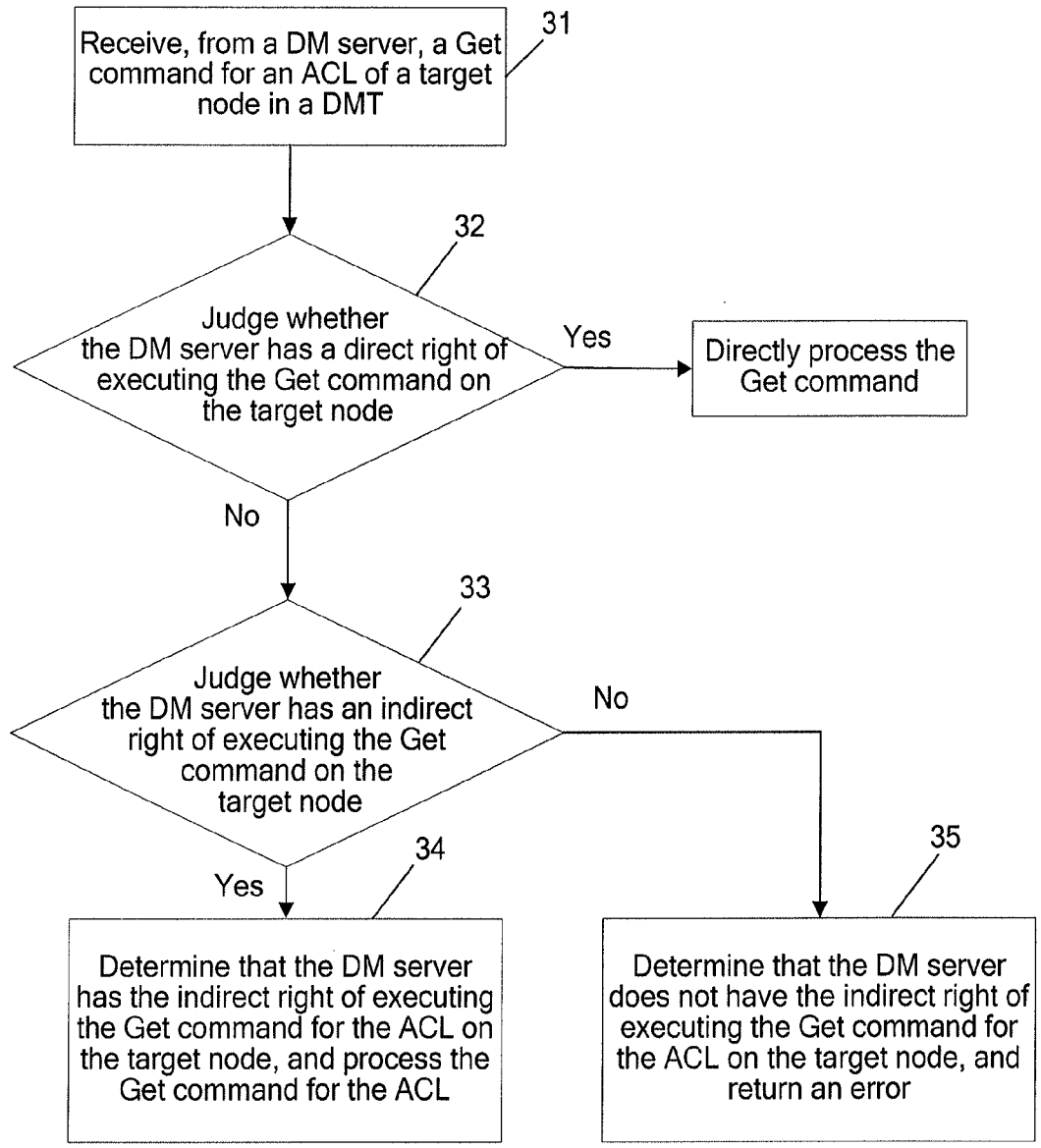
FIG. 3 is a schematic flow chart of a method for getting an ACL based on right control according to a second embodiment of the present invention.

A second embodiment of the present invention further provides a method for getting an ACL based on right control. FIG. 3 is a schematic flow chart of the method for getting the ACL based on right control. The getting method includes the following steps.

In step 31, a Get command, from a DM server, for an ACL of a target node in a DMT is received.

Specifically, when the DM server needs to execute the Get command on the ACL of the target node in the DMT of a terminal device, the DM server sends the Get command on the ACL to the terminal device. A particular functional module in the terminal device receives the Get command on the ACL.

In step 32, it is judged whether the DM server has a direct right of executing the Get command on the ACL of the target node.

Specifically, the terminal device may judge according to a value of an ACL of the target node whether the DM server has the direct right of executing the Get command on the ACL of the target node. For example, firstly the value of the ACL of the target node is gotten; it is judged whether a Get item in the gotten value of the ACL includes an identifier of the DM server; and if the Get item in the gotten value of the ACL includes the identifier of the DM server, it is determined that the DM server has the direct right of executing the Get command on the ACL of the target node, and then the Get command on the ACL is directly processed; if the Get item in the gotten value of the ACL does not include the identifier of the DM server, the judgment in step 33 is performed subsequently.

In step 33, it is judged whether the DM server has an indirect right of executing the Get command of the target node.

Specifically, in the step, a right speculation manner is also utilized to judge whether the DM server has the indirect right of executing the Get command on the ACL of the target node. However, the specific speculation manners vary with different speculation items and different nodes on which speculation is performed. For example, it is judged whether the DM server has a Replace right for a certain node between the target node and a root node of the DMT. A specific judging method may include the following steps. It is judged level-by-level from the target node to the root node of the DMT whether a node, a Replace item in a property value of the ACL of which includes an identifier of the DM server, exists. If the node, a Replace item in a property value of the ACL of which includes the identifier of the DM server, exists, it is determined that the DM server has the Replace right for the node between the target node and the root node of the DMT. The node refers to a node, the Replace item in the property value of the ACL of which includes the identifier of the DM server. Hence, it is determined that the DM server has the indirect right of executing the Get command on the target node, and then step 34 is performed; if the node, a Replace item in a property value of the ACL of which includes the identifier of the DM server, does not exist, step 35 is performed.

Besides, by judging whether the DM server has a Get right for a parent node of the target node, it is further determined whether the DM server has the indirect right of executing the Get command on the ACL of the target node. Specifically, it is judged whether the Get item in the value of the ACL of the parent node of the target node includes the identifier of the DM server. If the Get item in the value of the ACL of the parent node of the target node includes the identifier of the DM server, it is determined that the DM server has the Get right for the parent node. Hence, it is determined that the DM server has the indirect right of executing the Get command on the target node, and then step 34 is performed; if the Get item in the value of the ACL of the parent node of the target node does not include the identifier of the DM server, step 35 is performed. The judging manner makes the judging process more concise, which can be accomplished in only one step, and the judging process is more flexible.

Moreover, if a Replace item is adopted as a speculation item, it is further directly judged whether the Replace item in the value of the ACL of the parent node of the target node includes the identifier of the DM server. If the Replace item in the value of the ACL of the parent node of the target node includes the identifier of the DM server, it is determined that the DM server has a Replace right for the parent node. Hence, it is determined that the DM server has the indirect right of executing the Get command on the target node, and then step 34 is performed; if the Replace item in the value of the ACL of the parent node of the target node does not include the identifier of the DM server, step 35 is performed. Likewise, the judging manner also makes the judging process more concise, which can be accomplished in only one step without the need of judging level-by-level, and further simplifies the complexity of right management.

In step 34, it is determined that the DM server has the indirect right of executing the Get command on the ACL of the target node, and the Get command on the ACL is processed.

The processing the Get command on the ACL may be as follows: The terminal device gets the value of the ACL of the target node, and then the gotten value of the ACL is returned to the DM server following execution success status information of the management command. If the target node obtains the gotten value of the ACL by inheriting a value of an ACL of its ancestor node, instruction information needs to be returned at the same time. The instruction information is used to demonstrate that the gotten value of the ACL is inherited.

In step 35, it is determined that the DM server does not have the indirect right of executing the Get command on the ACL of the target node, and an error is returned.

Likewise, by implementing the technical solution, the capability of right speculation of the terminal device is enhanced, the complexity of right management is simplified, and the number of times of message interaction between the DM server and the terminal device is reduced, thereby improving the efficiency and performance of terminal device management. Meanwhile, by implementing the technical solution, in a case of not having the direct Get right of an ACL of a child node, the DM server can still get the ACL of the child node through right speculation, so that before replacing the ACL of the child node, the DM server firstly learns an original value of the ACL of the child node, and operates on the basis of the original value of the ACL, so as to manage the right more appropriately.

Further, the Get command on the ACL may include a path of the target node and an instruction for returning the ACL. The instruction for returning the ACL is used for demonstrating whether a property of all the nodes on the path from the target node to the root node is gotten, and the type of the gotten property is the ACL.

In this manner, when the instruction for returning the ACL demonstrates that the ACL property of all the nodes on the path from the target node to the root node needs to be gotten, the terminal device gets the values of the ACLs of all the nodes for which the DM server has the Get right on the path from the target node to the root node, and then returns the gotten values of the ACLs. Further, when a plurality of property values of the target node needs to be gotten, it is firstly judged whether the DM server has a direct right or indirect right of executing the Get command on the target node. If the DM server has the direct right or indirect right of executing the Get command on the target node, the plurality of property values of the target node is gotten, and is returned to the DM server. By adding the capability of getting a certain property of all the nodes or the capability of getting a plurality of properties of one target node on one target node path once, the DM server can get the desired property by performing interaction with the terminal device once only, which effectively reduces the processing pressure on the DM server and the terminal device as well as the pressure on network transmission.

Figure 4:
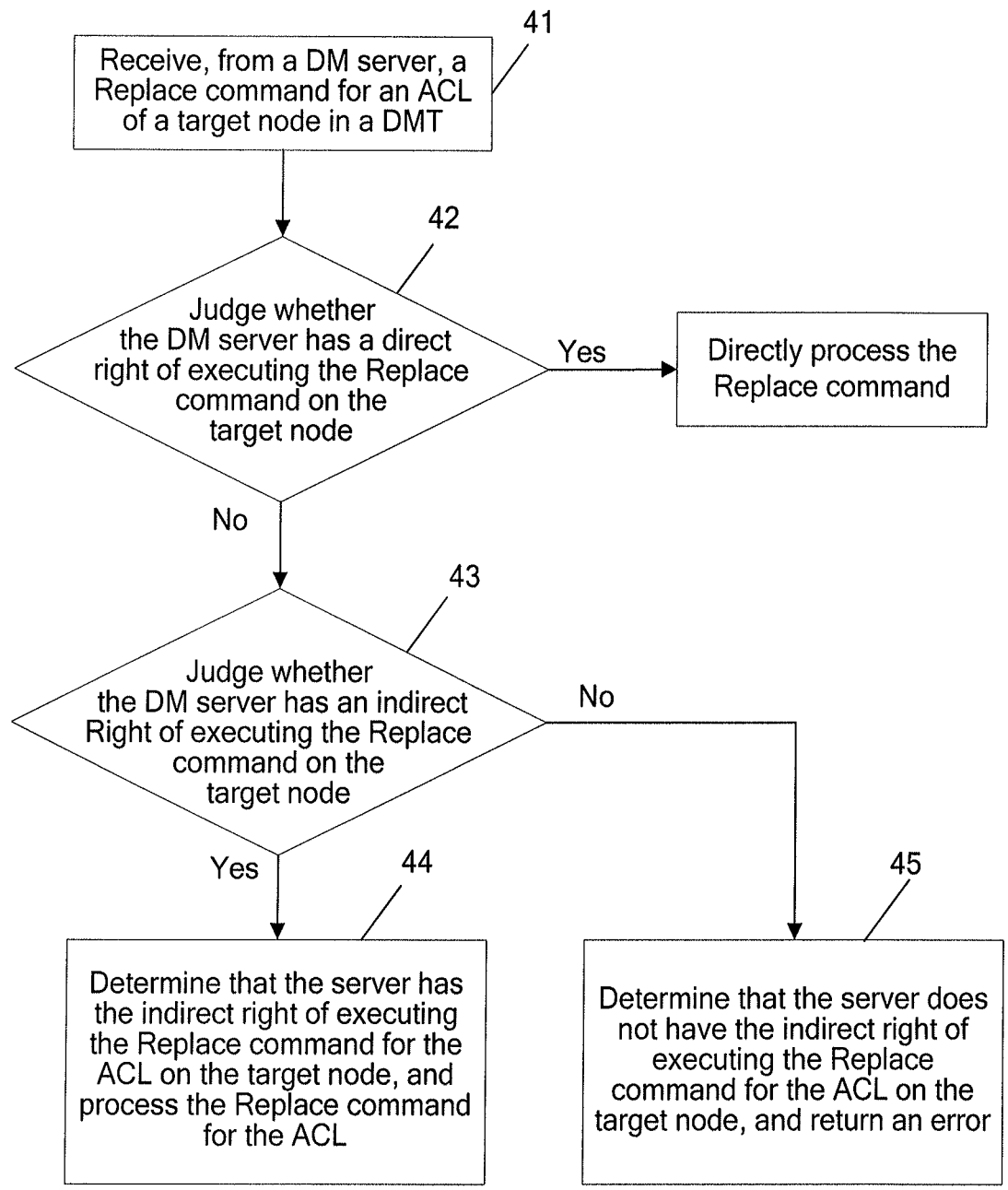
FIG. 4 is a schematic flow chart of a method for replacing an ACL based on right control according to a third embodiment of the present invention.

A third embodiment of the present invention further provides a method for replacing an ACL based on right control. FIG. 4 is a schematic flow chart of the method for replacing the ACL based on right control. The replacing method includes the following steps.

In step 41, a Replace command, from a DM server, for an ACL of a target node in a DMT is received.

Specifically, when the DM server needs to execute the Replace command on the ACL of the target node in the DMT of a terminal device, the DM server sends the Replace command on the ACL to the terminal device. A particular functional module in the terminal device receives the Replace command on the ACL.

In step 42, it is judged whether the DM server has a direct right of executing the Replace command on the ACL of the target node.

Specifically, the terminal device may judge whether the DM server has a direct right of executing the Replace command on the ACL of the target node. For example, if the target node is an internal node, a value of the ACL of the target node or its parent node is gotten, and it is judged whether a Replace item in the value of the ACL of the target node or its parent node includes an identifier of the DM server. If the target node is a leaf node, a value of an ACL of a parent node of the target node is gotten, and it is judged whether the Replace item in the value of the ACL of the parent node of the target node includes an identifier of the DM server. If the Replace item in the value of the ACL of the parent node of the target node includes the identifier of the DM server, it is determined that the DM server has the direct right of executing the Replace command on the ACL of the target node, and the Replace command on the ACL is directly processed; if the Replace item in the value of the ACL of the parent node of the target node does not include the identifier of the DM server, the judgment in step 43 is performed subsequently.

In step 43, it is judged whether the DM server has an indirect right of executing the Replace command on the target node.

Specifically, in the step, a right speculation manner is also utilized to judge whether the DM server has the indirect right of executing the Replace command on the ACL of the target node. For example, it is judged whether the DM server has a Replace right for a certain node between the target node and a root node of the DMT. A specific judging method may be as follows: It is judged level-by-level from the target node to the root node of the DMT whether a node, a Replace item in a value of an ACL of which includes an identifier of the DM server, exists. If the node, a Replace item in a value of an ACL of which includes an identifier of the DM server, exists, it is determined that the DM server has a Replace right for the node. Hence, it is determined that the DM server has the indirect right of executing the Replace command on the target node, and then step 44 is performed subsequently; if the node, a Replace item in a value of an ACL of which includes an identifier of the DM server, does not exist, step 45 is performed.

In step 44, it is determined that the DM server has the indirect right of executing the Replace command on the ACL of the target node, and the Replace command on the ACL is processed.

The processing the Replace command on the ACL is that the value of the ACL of the target node is replaced according to the Replace command of the ACL, and then information of successful command execution is returned.

In step 45, it is determined that the DM server does not have the indirect right of executing the Replace command on the ACL of the target node, and an error is returned.

Likewise, by implementing the technical solution, the capability of right speculation of the terminal device is enhanced, the complexity of right management is simplified, and the number of times of message interaction between the DM server and the terminal device is reduced, thereby improving the efficiency and performance of terminal device management.

As operations performed by the DM server on the ACL property of the target node in the DMT generally can be categorized into two types, that is, reading and writing, which are respectively corresponding to the Get command and the Replace command in OMA DM. The following embodiments are described for reading and writing of the value of the ACL and for management of the target node in the DMT respectively.

In a fourth embodiment of the present invention, a DM server gets a value of an ACL of a target node in a DMT.

From the perspective of data structure, the ACL exists as a property of a managed node in a DMT. In the specific implementation, a value of the ACL may exist in the property of the node, or exist at other locations of a non-volatile storage of a terminal device. No matter in which manner the ACL is implemented, its implementation procedure does not change.

Figure 5:
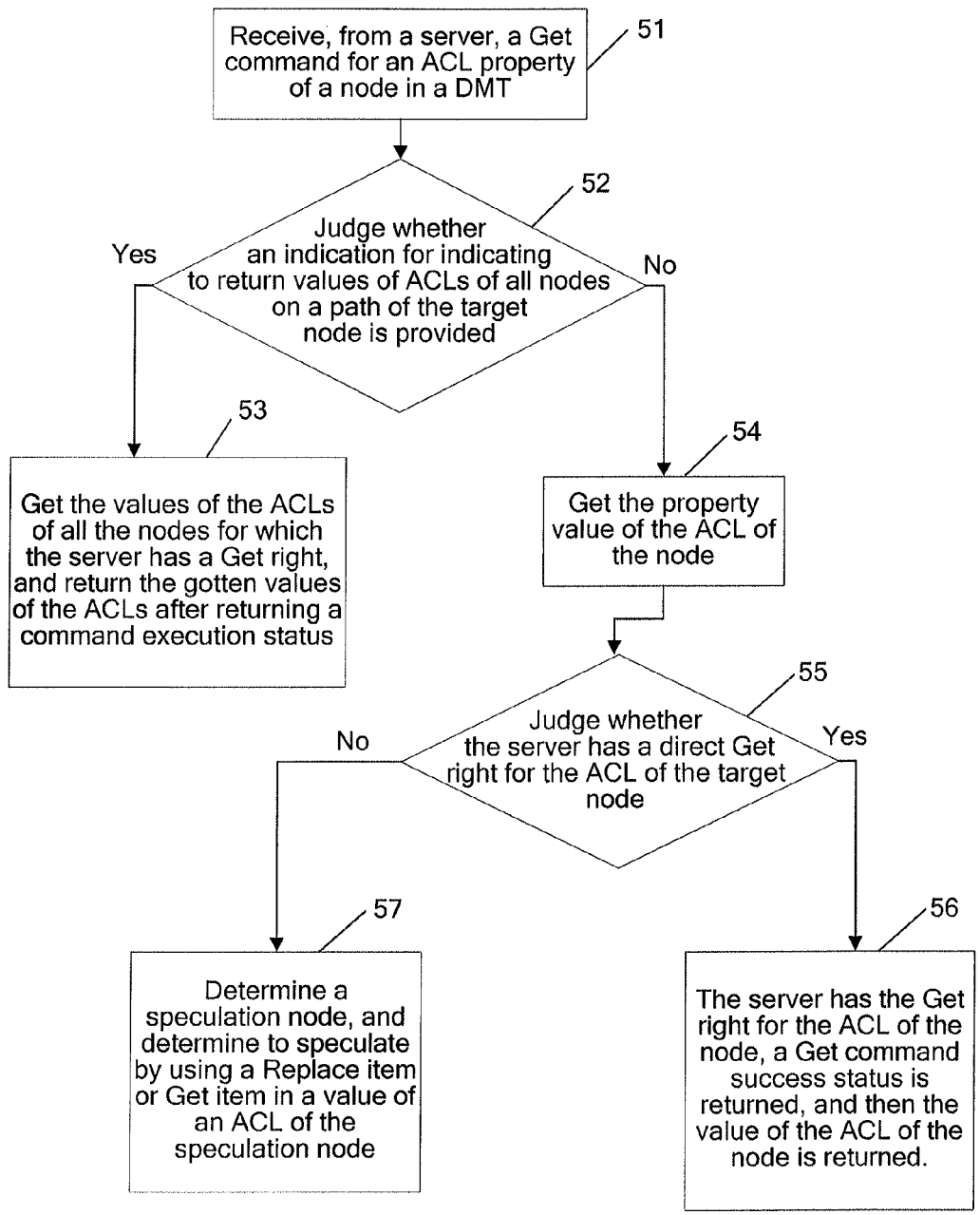
FIG. 5 is a schematic flow chart that a DM server gets a value of an ACL of a target node in a DMT according to a fourth embodiment of the present invention.

Getting an ACL of a certain managed node in the DMT by the DM server is realized by sending a Get command on an ACL property of the managed node. FIG. 5 is a flow chart of processing after receiving the command by the terminal device according to the fourth embodiment of the present invention, which includes the following steps.

In step 51, a Get command on an ACL property of a certain managed node (hereinafter referred to as a target node) in a terminal DMT from a certain DM server is received. The command carries a URI of the target node. Then, step 52 is performed.

In step 52, if the Get command carries an instruction for instructing a terminal device to return ACLs of all nodes (that is, ACLs of the target node, the root node, and all the nodes between the target node and the root node) in the URI of the target node, step 53 is performed; while if the Get command only carries an instruction for getting the ACL property of the target node, step 54 is performed.

The instruction for instructing the terminal device to return the ACLs of all the nodes in the URI of the target node is formed by adding an instruction for returning information of all the nodes in the URI on the basis of an expression for getting the ACL property (consisting of property names of the URI and the ACL of the target node). The method can be used to get a certain property value or a plurality of property values of all nodes with a right in a certain URI. For the ACL, the instruction may be denoted as follows (it is similar in getting other properties):

```
.\NodeA\NodeB?list=NodesInURI+ACL
or.\NodeA\NodeB?prop=ACL&list=URI
```

In the first expression, a parameter of list=NodesInURI carried after a path denotes that the terminal device needs to return the information of all the nodes in the URI. Following the parameter, a + sign is used to connect a node property (here, an ACL property), to indicate that the information returned by the terminal device is the property value. The combination of the parameter and the property denotes that the terminal device is required to return the property values of all the nodes on the path. In the second expression, a parameter of list=URI carried after a path denotes that the terminal device needs to return all the values in the URI. Following the parameter, another parameter of prop=ACL is carried to indicate that the values returned by the terminal device are the property values. The combination of the two parameters denotes that the terminal device is required to return the property values of all the nodes on the path.

An instruction for getting the ACL property of the target node may be denoted as follows:
.\NodeA\NodeB?prop=ACL To enable the DM server to get a plurality of properties of the target node simultaneously without sending a plurality of Get commands, so as to reduce the message size and the complexity of generating the Get message by the DM server, the present invention provides the capability of getting a plurality of properties of the target node of the terminal device with a single Get command. The specific implementation of the capability is as follows.

A Get command, sent by the DM server, for getting a property of a certain node in a DMT or all nodes in a certain URI carries an instruction for getting a plurality of property values of the target node. Further, the instruction is carried in a value of a <Target>/<LocURI> element of the Get command as a value of a prop parameter of the URI of the target node, which is described as follows.

A plurality of prop parameters can be used, a value of each prop parameter is a property name of a target node, and a space character (such as "&") is used to space among the plurality of prop parameters, an example of which is given as follows:
<LocURI>.\NodeA?prop=ACL&prop=Format&prop=Type</LocURI>

Or, a prop parameter can be used, a value of the prop parameter is a plurality of property names of the target node, and one space character (such as "+") is used among the plurality of property names, an example of which is given as follows:
<LocURI>.\NodeA?prop=ACL+Format+Type</LocURI>

The instruction is used for instructing the terminal device to return a plurality of property values of a node with a Get right to the DM server. After receiving the Get command, the terminal device firstly judges whether the DM server sending the Get command has a Get right for a target node (a judging method is that: a Get item in an ACL of the target node has an identifier of the DM server; and if a gotten property is the ACL, it is further judged whether a Get item in an ACL of a parent node of the target node has the identifier of the DM server). If the Get item has the identifier of the DM server, a plurality of property values of the target node is retrieved, and one or more Results commands are generated to return the plurality of property values. If one Results command is used to return the plurality of property values, each property value is corresponding to an Item (<Item>element) of the Results command. The <Item>/<Source>/<LocURI> is a path and a returned property name of the target node, and <Data> is a property value of the property.

By providing the capability, the DM server is enabled to get one or more properties of the target node through one command, which avoids the phenomenon that the DM server generates a plurality of Get commands for getting a plurality of property values of the target node, reduces the message quantity, and reduces the processing pressure on the DM server as well as the pressure on network transmission.

In step 53, values of ACLs of all nodes for which the DM server has a Get right in the URI specified in the Get command are gotten, and the gotten values of the ACLs are returned after returning a command execution status.

Two methods for judging whether the DM server has the Get right are provided.

Method A: If a Get item in an ACL (including an inheritance value) of a certain node includes the identifier of the DM server, it is determined that the DM server has a Get right for the ACL of the node.

Method B: If the DM server has a Replace right of a certain node among ancestor nodes of the node, in other words, a Replace item in a value of an ACL of the certain node includes the identifier of the DM server, it is determined that the DM server has a Get right for the ACL of the node.

Method A can be used individually to judge; or method A and method B may be combined to judge: Method A is used for judging whether the DM server has a direct Get right, and method B is used for judging in an auxiliary way whether the DM server has an indirect Get right.

A manner of returning the gotten value of the ACL is as follows. An ACL of each node is returned as a plurality of Items of a single Results command, or returned as a plurality of Results commands. If the property value of the ACL of the node is empty, an empty value is returned, or a value of an ACL inherited by the node is returned, and meanwhile it is demonstrated in the returned result that the value is inherited.

In the method, by adding the capability of getting a certain property (such as an ACL) or a plurality of properties of all nodes in one URI, the DM server can get the desired property through interaction once, without the need of getting the desired property individually for each node or getting a certain subtree (a great number of unrelated nodes are carried, and the amount of data is large), which effectively reduces the processing pressure on the DM server and the terminal device as well as the pressure on network transmission.

In step 54, the value of the ACL of the target node is gotten.

If the property value of the ACL of the node is empty, searching begins from the node to an ancestor node, and a property value of an ACL of an ancestor node closest to the node and the value of the ACL of which is not empty is gotten as the value of the ACL of the node (a subsequent related method that the terminal device gets a value of an ACL of a certain managed node in its management tree is the same as this method, and a relation between the value of the ACL and the property value of the ACL is as follows: A value of an ACL of a certain node refers to a value of an ACL having an actual effect on the node; and if the property value of the ACL of the node is not empty, the value is the property value; while if the property value of the ACL of the node is empty, the value is inherited). After the value of the ACL of the target node is gotten, step 55 is performed.

In step 55, it is judged whether the DM server has a direct Get right for the ACL of the target node, and specifically it is judged whether an item (that is, a Get item) corresponding to the Get command on the gotten value of the ACL includes the identifier of the DM server. The identifier of the DM server is used to uniquely identify one DM server, and the identifier exists in a DM account of the terminal device for the DM server, that is, in a DMAcc management object instance of the DMT.

A method for judging whether the identifier of the DM server is included is exemplified as follows. If Get=ServerA+ServerB&Replace=ServerA, a Get item includes identifiers ServerA and ServerB of the DM servers; while if the Get item is Get=*, it is determined the Get item includes any identifier of the DM servers. A similar judgment is described in the following.

If the judging result is that the Get item includes any identifier of the DM servers, it indicates that the DM server has a direct Get right for the ACL of the node, and step 56 is performed; if the judging result is that the Get item does not include any identifier of the DM servers, it indicates that the DM server does not have the direct Get right for the ACL of the node, and step 57 is performed.

In step 56, the DM server has the direct Get right for the ACL of the node, gets the value of the ACL of the node, and returns the value of the ACL of the node after returning a Get command success status to the DM server.

If the property value of the ACL of the node is not empty, the property value of the ACL of the node is returned. If the property value of the ACL of the node is empty, the value of the ACL inherited by the node is returned, and it is demonstrated in a returned result that the value is inherited. A specific demonstration method may be that: an identifier field of "Inheritance:" is added before the value of the ACL. For example, the identifier field is written as: Inheritance: Get=ServerA+ServerB&Replace=ServerA.

In step 57, a speculation node is determined, and a Replace item or Get item in a value of an ACL of the speculation node is used to speculate, so as to judge whether the DM server has an indirect Get right for the ACL of the node.

In accordance with different determined speculation nodes and speculation items, the specific speculation method may be categorized as follows.

1) If the determined speculation node is a parent node of the node, the speculation is as follows. If a Replace item in the value of the ACL of the speculation node includes the identifier of the DM server (that is, the DM server has a Replace right for the speculation node), it is determined that the DM server has an indirect Get right for the ACL of the node, the Get command success status is returned, and then the value of the ACL of the node is returned. If the Replace item in the value of the ACL of the speculation node does not include the identifier of the DM server, the DM server does not have the indirect Get right for the ACL of the node, and a Get failure status is returned.

2) If the determined speculation nodes are ancestor nodes of the node from near to far, the speculation is as follows. Starting from the node, a node, a Replace item in a property value of an ACL of an ancestor node of which includes the identifier of the DM server, is searched. Firstly, a parent node of the node is searched, and then a grandparent node of the node is searched, and so forth, until a node satisfying the condition is found or the root node of the DMT is found. If the node satisfying the condition is found, it is determined that the DM server has the indirect Get right for the ACL of the node, the Get command success status is returned, and then the value of the ACL of the node is returned. If a Replace item in a property value of an ACL of all ancestor nodes does not include the identifier of the DM server, it is determined that the DM server does not have the indirect Get right for the ACL of the node, and the Get failure status is returned.

3) If the Get item is used to speculate, the determined speculation node is a parent node of the node. The speculation method is as follows: If the Get item in the value of the ACL of the speculation node includes the identifier of the DM server, the DM server has the indirect Get right for the ACL of the node, the Get command success status is returned, and then the value of the ACL of the node is returned. If the Get item in the value of the ACL of the speculation node does not include the identifier of the DM server, the DM server does not have the indirect Get right for the ACL of the node, and the Get failure status is returned.

After determining that the DM server has the indirect Get right for the ACL of the node, a specific ACL returning method is categorized into two types.

Type A: No matter whether the property value of the ACL of the node is empty, the property value of the ACL of the node is directly returned (if the property value is empty, a returned value is empty).

Type B: If the property value of the ACL of the node is not empty, the property value of the ACL of the node is returned. If the property value of the ACL of the node is empty, the value of the ACL inherited by the node is returned, and it is demonstrated in a returned result that the value is inherited. A specific demonstration is implemented by carrying instruction information. For example, the identifier field of "Inheritance:" is added before the value of the ACL.

Through an operation of the specific embodiment, a DM server without a Get right for a certain managed node but with a certain right for a parent node or an ancestor node of the managed node can get an ACL property of the managed node, so as to more effectively manage and maintain the ACL, and an adopted right speculation method can guarantee the reasonableness of getting the value of the ACL. When getting the ACL, through an instruction of returning a value inherited by a node (a property value of an ACL of which is empty) inheriting a right and instructing inheritance for the node, the DM server gets a value of an ACL having an actual effect on the node, and further learns that the value is inherited, which reduces the number of times of interactions performed between the DM server and the terminal device to get the value of the ACL by inheritance, and reduces the pressure on network transmission and the processing pressure on the DM server.

In a fifth embodiment of the present invention, a DM server replaces a value of an ACL of a target node.

Based on this embodiment, to execute a certain DM command, such as Add, Delete, Replace, Get, or Copy, on a certain managed node in a DMT of a terminal device, the DM server firstly needs to have a right of executing the management command on the node, and then sends the management command.

For example, if a certain DM server needs to execute a Delete command on a managed node of .\NodeA\NodeB in the DMT to delete the managed node and its child node, it is assumed that a unique identifier of the DM server is ServerA, and if a Delete item in an ACL of the managed node does not have the ServerA identifier (if the ACL of the managed node is empty, it is determined that the Delete item in the ACL inherited by the managed node does not have the ServerA identifier), before successfully executing the Delete command, the DM server needs to firstly replace the ACL of the managed node, so that the Delete item includes the ServerA identifier.

Figure 6:
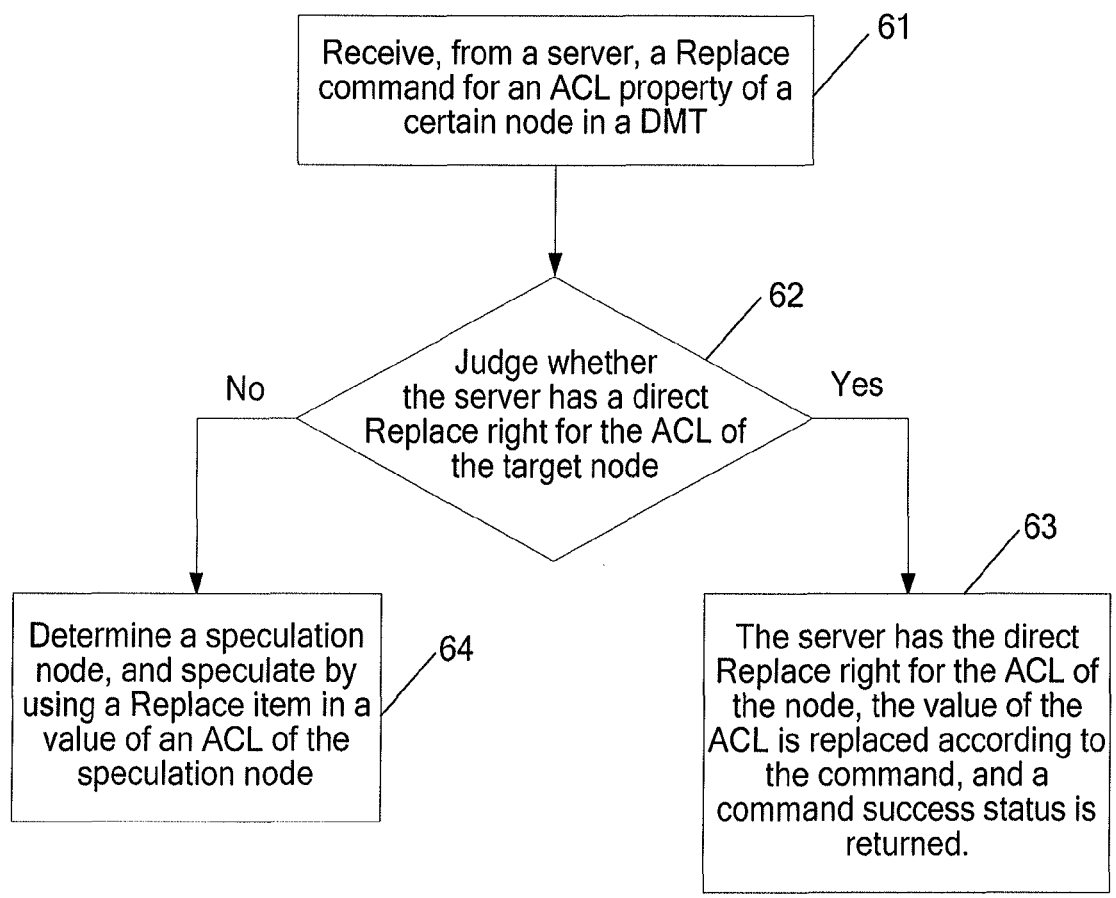
FIG. 6 is a schematic flow chart that a DM server replaces a value of an ACL of a target node according to a fifth embodiment of the present invention.

A method that a server replaces a value of an ACL of a certain managed node is described in detail hereinafter. FIG. 6 is a schematic flow chart according to the fifth embodiment of the present invention, which includes the following steps.

In step 61, a Replace command on an ACL property of a certain managed node (hereinafter referred to as a target node) of a DMT from a certain DM server is received, and then step 62 is performed.

In step 62, it is judged whether the DM server has a direct Replace right for the ACL of the target node, which is described as follows. If the target node is an internal node, it is judged whether an item (that is, a Replace item) corresponding to the Replace command on the value of the ACL of the target node or a Replace item in a value of an ACL of a parent node of the target node includes an identifier of the DM server. If the target node is a leaf node, it is only judged whether the Replace item in the value of the ACL of the parent node of the target node includes the identifier of the DM server. If the Replace item in the value of the ACL of the parent node of the target node includes the identifier of the DM server, it indicates that the DM server has a direct Replace right for the ACL of the node, and then step 63 is performed; if the Replace item in the value of the ACL of the parent node of the target node does not include the identifier of the DM server, it indicates that the DM server does not have the direct Replace right for the ACL of the node, and then step 64 is performed to further judge whether the DM server has an indirect Replace right.

In step 63, it is determined that the DM server has the direct Replace right for the ACL of the node, the value of the ACL is replaced according to the received Replace command, and a command execution success status is returned.

In step 64, it is determined that the DM server does not have the direct Replace right for the ACL of the node, a speculation node is determined, and a Replace item in a property value of an ACL of the speculation node is used to speculate, so as to judge whether the DM server has an indirect Replace right for the ACL of the node.

A specific speculation method is that the speculation starts from the target node to its ancestor node, so as to determine whether the DM server has an indirect Replace right. Specifically, starting from the node, a node, a Replace item in a property value of an ACL of an ancestor node of which includes the identifier of the DM server, is searched. Firstly, a parent node of the node is searched, and then a grandparent node of the node is searched, and so forth, until a node satisfying the condition is found or the root node of the DMT is found.

If the node satisfying the condition is found, it is determined that the DM server has the indirect Replace right for the ACL of the target node, then the value of the ACL is replaced according to the received Replace command, and a command success status is returned. If a Replace item in a value of an ACL of the node to the root node of the DMT does not include the identifier of the DM server, it is determined that the DM server does not have a Replace right for the ACL of the node, and a failure status is returned.

After accomplishing the replacement of the right, other properties of the target node (if the target node is the leaf node, a node value is further included) can be replaced subsequently. Further, before replacing the ACL of the target node, in order not to lose existing right information, the DM server can firstly get a current ACL of the target node, then generates a new ACL based on the current ACL, and uses the method according to this embodiment to replace the ACL of the target node. The method for getting the value of the ACL may refer to the description in the fourth embodiment.

By implementing the technical solution of the fifth embodiment, the DM server having a Replace right for an ancestor node of a certain managed node can directly replace an ACL of the managed node, which avoids the trouble of replacing level-by-level, and meanwhile effectively guarantees the reasonableness of replacing the value of the ACL according to right speculation.

In a sixth embodiment of the present invention, a processing procedure that a DM server executes a management command on a target node is described.

Based on this embodiment, the DM server needs to execute a certain DM command on a certain managed node in a DMT of a certain terminal device, such as getting or replacing a property or value of the managed node, or deleting the managed node, or adding a child node to the managed node, or instructing the terminal device to execute one action corresponding to the managed node. At this time, the DM server generates and sends a corresponding management command to the terminal device. After receiving the management command, the terminal device needs to judge whether the DM server has an Exec right for the management command. If the DM server has the Exec right for the management command, the management command is processed, and a success status is returned after the processing completes; if the DM server does not have the Exec right for the management command, the operation is rejected and an error is returned.

Figure 7:
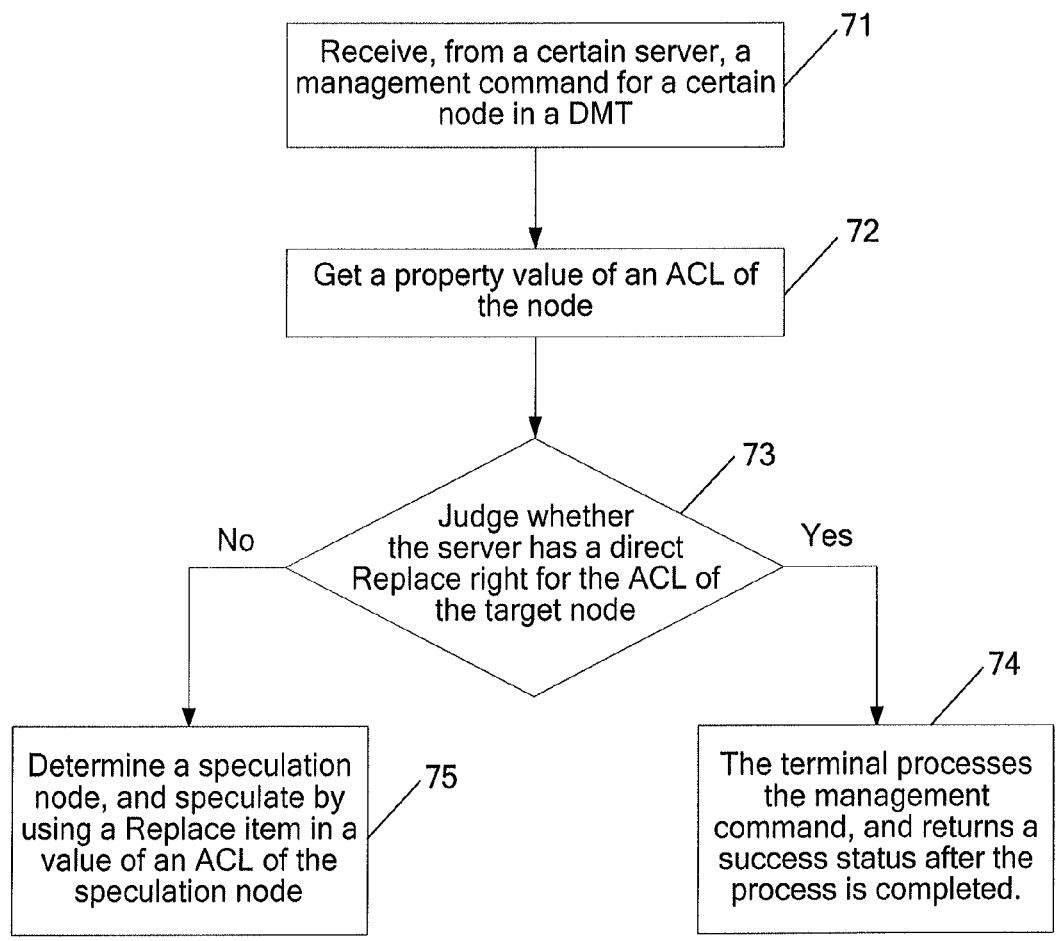
FIG. 7 is a schematic flow chart that a DM server executes a management command on a target node according to a sixth embodiment of the present invention.

A method for processing after receiving, by a terminal device, the management command executed by the DM server on the target node is described in detail hereinafter. FIG. 7 is a schematic flow chart of the method according to the sixth embodiment of the present invention, where the method includes the following steps.

In step 71, a management command, sent by a DM server, for a target node in a DMT is received. The management command may be getting or replacing a property or value of the managed node, or deleting the managed node, or adding a child node to the managed node, or instructing the terminal device to execute an action corresponding to the managed node.

In step 72, the property value of the ACL of the managed node is gotten. If the property value of the ACL of the node is empty, searching begins from the node to an ancestor node, and a property value of an ACL of an ancestor node closest to the node and the value of the ACL of which is not empty is gotten as the value of the ACL of the node. Then, step 73 is performed subsequently.

In step 73, it is judged whether the DM server has a direct right of executing the management command on the target node, and specifically it is judged whether the gotten value of the ACL has an item corresponding to the management command and whether the corresponding item includes an identifier of the DM server. As some DM commands do not allocate a right directly in the ACL, that is, have no direct corresponding item and are embodied through a right allocated by another related DM command in the ACL, the related DM command is the item corresponding to the ACL. For example, an item corresponding to a Get command in the ACL is Get, and items corresponding to a Copy command in the ACL are Add, Get, Replace, and Delete.

If the gotten value of the ACL has the item corresponding to the management command and the corresponding item includes the identifier of the DM server, it indicates that the DM server has the direct right of executing the management command on the managed node, and step 74 is performed subsequently. If the gotten value of the ACL does not have the item corresponding to the management command or the corresponding item does not include the identifier of the DM server, it indicates that the DM server does not have the direct right of executing the management command on the managed node, and step 75 is performed subsequently to judge whether the DM server has an indirect right.

In step 74, the DM server has the direct right of executing the management command on the managed node, the terminal device processes the management command, and a success status is returned after the processing completes.

In step 75, the DM server does not have the direct right of executing the management command on the managed node, a speculation node is determined, and a Replace item in a value of an ACL of the speculation node is used to speculate, so as to judge whether the DM server has the indirect right of executing the management command on the managed node.

A specific speculation method is that the speculation starts from the node to its ancestor node. Specifically, starting from the node, a node, a Replace item in a value of an ACL of an ancestor node of which includes the identifier of the DM server, is searched. Firstly, a parent node of the node is searched, and then a grandparent node of the node is searched, and so forth, until a node satisfying the condition is found or the root node of the DMT is found.

If the node satisfying the condition is found, it is determined that the DM server has the indirect right of executing the management command on the managed node, the terminal device processes the management command, and a success status is returned after the processing completes. If a Replace item in a value of an ACL of the node to the root node of the DMT does not include the identifier of the DM server, it is determined that the DM server does not have the indirect right of executing the management command on the managed node, and a command failure status is returned.

By implementing the technical solution of the sixth embodiment, when a DMT has multi-level rights, the terminal device only needs to judge level-by-level whether the DM server has a Replace right. If the DM server has the Replace right, it is determined that the DM server has an Exec right for a target management command of a target managed node, so as to prevent the DM server from getting and replacing a right level-by-level, thereby reducing the number of times of message interaction between the DM server and the terminal device, reducing the pressure on the DM server and the terminal device as well as the pressure on network transmission, and improving the efficiency and performance of terminal device management.

Figure 8:
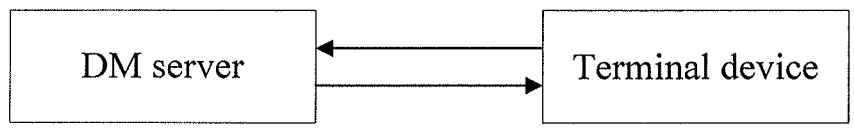
FIG. 8 is a schematic structural diagram of a system according to a seventh embodiment of the present invention.

In a seventh embodiment, the present invention further provides a system for terminal device management based on right control. FIG. 8 is a schematic structural diagram of the system. As shown in FIG. 8, the system includes a DM server and a terminal device.

The DM server is configured to send a management command to the terminal device.

The terminal device is configured to receive a management command on a target node in a DMT from a DM server, judge whether the DM server has a direct right of executing the management command on the target node, then process the management command if the DM server has the direct right, judge whether the DM server has an indirect right of executing the management command on the target node if the DM server does not have the direct right, and process the management command if the DM server has the indirect right.

Figure 9:
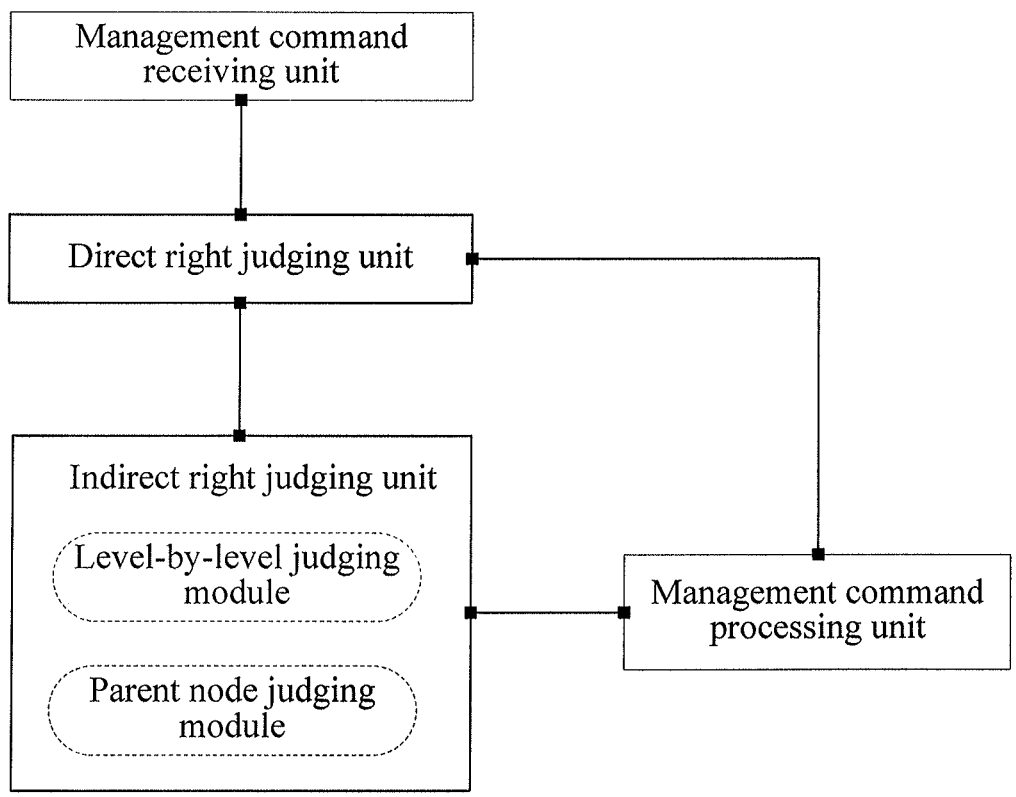
FIG. 9 is a schematic structural diagram of a device for terminal device management based on right control according to an eighth embodiment of the present invention.

In an eighth embodiment, the present invention further provides a device for terminal device management based on right control. FIG. 9 is a schematic structural diagram of the device for terminal device management based on right control. As shown in FIG. 9, the device includes a management command receiving unit, a direct right judging unit, an indirect right judging unit, and a management command processing unit.

The management command receiving unit is configured to receive, from a DM server, a management command on a target node in a DMT.

The direct right judging unit is configured to judge whether the DM server has a direct right of executing the management command on the target node according to a property value of an ACL or a value of the ACL of the target node. If the DM server has the direct right of executing the management command on the target node, the management command processing unit performs a subsequent operation; if the DM server does not have the direct right of executing the management command on the target node, the indirect right judging unit processes subsequently. The specific judging manner is as described in the above embodiment of the method.

The indirect right judging unit is configured to judge whether the DM server has an indirect right of executing the management command on the target node. The specific judging manner is as described in the above embodiment of the method.

The management command processing unit is configured to process the management command. Specifically, when it is determined that the DM server has the direct right or indirect right of executing the management command on the target node, the management command is processed. The processing the management command is to execute a corresponding operation such as Add, Delete, Replace, Get, and Exec according to the management command received by the management command receiving unit.

Moreover, the indirect right judging unit may further include a level-by-level judging module. The level-by-level judging module is configured to judge level-by-level from the target node to the root node of the DMT whether a node, a Replace item in a value of an ACL of which includes an identifier of the DM server, exists; and determine that the DM server has the indirect right of executing the management command on the target node if the node exists.

Optionally, the indirect right judging unit may further include a parent node judging module. The parent node judging module is configured to judge whether the Replace item in the value of the ACL of the parent node of the target node includes an identifier of the DM server; and if the Replace item in the value of the ACL of the parent node of the target node includes the identifier of the DM server, determine that the DM server has the indirect right of executing the management command on the target node; if the Replace item in the value of the ACL of the parent node of the target node does not include the identifier of the DM server, return execution failure status information to the DM server.

The device may be integrally formed in a terminal device, or formed as an individual functional entity, and keep a connection relation with the terminal device.

Persons of ordinary skill in the art should understand that all or a part of the steps of the method according to the embodiments of the present invention may be implemented by a program instructing relevant hardware. The program may be stored in a computer readable storage medium. The storage medium may be a ROM/RAM, a magnetic disk, or an optical disk.

It can be seen from the technical solutions of the embodiments of the present invention that, firstly, a management command on a target node in a DMT from a DM server is received; and then it is judged whether the DM server has a direct right of executing the management command on the target node. If the DM server has the direct right, the management command is processed according to the direct right. If the DM server does not have the direct right, it is judged whether the DM server has an indirect right of executing the management command on the target node. If the DM server has the indirect right, the management command is processed according to the indirect right. In this manner, the capability of right speculation of a terminal device is enhanced. In other words, the terminal device is enabled to judge according to the indirect right whether a corresponding process can be performed, and the DM server does not need to replace a right level-by-level, so as to simplify the complexity of right management, and reduce the number of times of message interactions between the DM server and the terminal device, thereby improving the efficiency and performance of terminal device management.

In conclusion, the specific embodiments of the present invention can simplify the complexity of right management, reduce the number of times of message interactions between the DM server and the terminal device, and reduce the pressure on the DM server and the terminal device as well as the pressure on network transmission, so as to improve the efficiency and performance of terminal device management.

In conclusion, the above are merely some exemplary embodiments of the present invention. However, the scope of the present invention is not limited to these embodiments. Changes or replacements readily apparent to persons skilled in the art within the technical scope of the present invention should fall within the scope of the present invention. Therefore, the protection scope of the present invention is subject to the appended claims.

What is claimed is:

1. A method for replacing an Access Control List (ACL) of a managed node, comprising:
receiving by a terminal, a command from a Device Management (DM) server for replacing an Access Control List (ACL) of a managed node on a Device Management Tree (DMT), wherein the DMT comprises a plurality of levels, each level comprises at least one node, and the managed node is an internal node on the DMT, wherein the internal node comprises at least one descendant node;
determining by the terminal, whether the DM server has an authority to replace the ACL of the managed node according to the ACL of the managed node;
if the DM server does not have the authority to replace the ACL of the managed node, determining by the terminal, whether the DM server has an authority to replace an ACL of a parent node of the managed node according to the ACL of the parent node;
if the DM server does not have the authority to replace the ACL of the managed node and the DM server does not have the authority to replace the ACL of the parent node of the managed node, determining by the terminal, whether there exists an ancestor node of the managed node which is one or more level above the parent node of the managed node on the DMT, and wherein the DM server has an authority to replace an ACL of the ancestor node according to the ACL of the ancestor node;
if such ancestor node of the managed node exists, replacing by the terminal, the ACL of the managed node according to the command without replacing both the ACL of the parent node and the ACL of the ancestor node.

2. A method for replacing an Access Control List (ACL) of a managed node, comprising:
receiving by a terminal, a command from a Device Management (DM) server for replacing an Access Control List (ACL) of a managed node on a Device Management Tree (DMT), wherein the DMT comprises a plurality of levels, each level comprises at least one node, and the managed node is a leaf node on the DMT, wherein the leaf node has no more descendant node;
determining by the terminal, whether the DM server has an authority to replace an ACL of a parent node of the managed node according to the ACL of the parent node;
if the DM server does not have the authority to replace the ACL of the parent node of the managed node, determining by the terminal, whether there exists an ancestor node of the managed node which is one or more level above the parent node of the managed node on the DMT, wherein the DM server has an authority to replace an ACL of the ancestor node according to the ACL of the ancestor node;
if such ancestor node of the managed node exists, replacing, by the terminal, the ACL of the managed node according to the command without replacing both the ACL of the parent node and the ACL of the ancestor node.

3. A terminal device for replacing an Access Control List (ACL) of a managed node, comprising a memory, a receiver and a processor, wherein:
the memory is configured to store a Device Management Tree (DMT) of the terminal device;
the receiver is configured to receive a command from a Device Management (DM) server for replacing an Access Control List (ACL) of a managed node on the Device Management Tree (DMT), wherein the DMT comprises a plurality of levels, each level comprises at least one node, and the managed node is an internal node on the DMT, wherein the internal node comprises at least one descendant node; and
the processor is configured to:
determine whether the DM server has an authority to replace the ACL of the managed node according to the ACL of the managed node;
if the DM server does not have the authority to replace the ACL of the managed node, determine whether the DM server has an authority to replace an ACL of a parent node of the managed node according to the ACL of the parent node;
if the DM server does not have the authority to replace the ACL of the managed node and the DM server does not have the authority to replace the ACL of the parent node of the managed node, determine whether there exists an ancestor node of the managed node which is one or more level above the parent node of the managed node on the DMT, and wherein the DM server has an authority to replace an ACL of the ancestor node according to the ACL of the ancestor node;
if such ancestor node of the managed node exists, replace the ACL of the managed node according to the command without replacing both the ACL of the parent node and the ACL of the ancestor node.

4. A terminal device for replacing an Access Control List (ACL) of a managed node, comprising a memory, a receiver and a processor, wherein:
the memory is configured to store a Device Management Tree (DMT) of the terminal device;

the receiver is configured to receive a command from a Device Management (DM) server for replacing an Access Control List (ACL) of a managed node on the Device Management Tree (DMT), wherein the DMT comprises a plurality of levels, each level comprises at least one node, and the managed node is a leaf node on the DMT, wherein the leaf node has no more descendant node; and the processor is configured to:
  determine whether the DM server has an authority to replace an ACL of a parent node of the managed node according to the ACL of the parent node;
  if the DM server does not have the authority to replace the ACL of the parent node of the managed node, determine, whether there exists an ancestor node of the managed node which is one or more level above the parent node of the managed node on the DMT, and the DM server has an authority to replace an ACL of the ancestor node according to the ACL of the ancestor node;
  if such ancestor node of the managed node exists, replace the ACL of the managed node according to the command without replacing both the ACL of the parent node and the ACL of the ancestor node.

* * * * *